United States Patent
Choi et al.

(10) Patent No.: US 10,403,038 B2
(45) Date of Patent: Sep. 3, 2019

(54) 3D GEOMETRY ENHANCEMENT METHOD AND APPARATUS THEREFOR

(71) Applicant: INDUSTRY ACADEMY COOPERATION FOUNDATION OF SEJONG UNIVERSITY, Seoul (KR)

(72) Inventors: Soo Mi Choi, Seoul (KR); Il Kyu Shin, Seoul (KR); Yeo Jin Yoon, Seoul (KR)

(73) Assignee: INDUSTRY ACADEMY COOPERATION FOUNDATION OF SEJONG UNIVERSITY, Seoul (KR)

( * ) Notice: Subject to any disclaimer, the term of this patent is extended or adjusted under 35 U.S.C. 154(b) by 0 days.

(21) Appl. No.: 15/856,425

(22) Filed: Dec. 28, 2017

(65) Prior Publication Data

US 2019/0164338 A1 May 30, 2019

(30) Foreign Application Priority Data

Nov. 27, 2017 (KR) .................. 10-2017-0159416

(51) Int. Cl.
G06T 19/20 (2011.01)
G06T 17/00 (2006.01)
G06T 7/60 (2017.01)

(52) U.S. Cl.
CPC .............. *G06T 17/005* (2013.01); *G06T 7/60* (2013.01)

(58) Field of Classification Search
None
See application file for complete search history.

(56) References Cited

U.S. PATENT DOCUMENTS

| 7,365,744 B2 * | 4/2008 | Fang ..................... G06T 11/001 345/423 |
| 8,786,600 B1 | 7/2014 | Cantlay |
| 9,437,034 B1 * | 9/2016 | Wei .......................... G06T 15/04 |
| 2002/0089500 A1 * | 7/2002 | Jennings, Jr. ........... G06T 19/20 345/420 |
| 2012/0294534 A1 * | 11/2012 | Watanabe ........... G06F 17/5086 382/195 |
| 2016/0307369 A1 * | 10/2016 | Freedman ............... G06T 19/00 |

FOREIGN PATENT DOCUMENTS

| JP | 2011192214 A | 9/2011 |
| KR | 1020090029447 A | 3/2009 |
| KR | 10-2017-0008683 A | 1/2017 |
| WO | 2017062453 A1 | 4/2017 |

OTHER PUBLICATIONS

Korean Office Action dated Mar. 14, 2018, in connection with the Korean Patent Application No. 10-2017-0159416 citing the above reference(s).

\* cited by examiner

*Primary Examiner* — Martin Mushambo
(74) *Attorney, Agent, or Firm* — Hauptman Ham, LLP

(57) ABSTRACT

A 3D geometry enhancement method and an apparatus therefor. A random forest regressor is built using sketch patches and displacement patches, wherein the displacement patches are patches corresponding to the sketch patches and placing on a displacement map of a 3D geometry model. A new sketch is received. Displacement patches respectively corresponding to sketch patches are extracted by applying the sketch patches extracted from the new sketch to the built random forest regressor. A displacement map with respect to a 3D geometry model is generated using the extracted displacement patches. The generated displacement map is applied to the 3D geometry model.

10 Claims, 12 Drawing Sheets

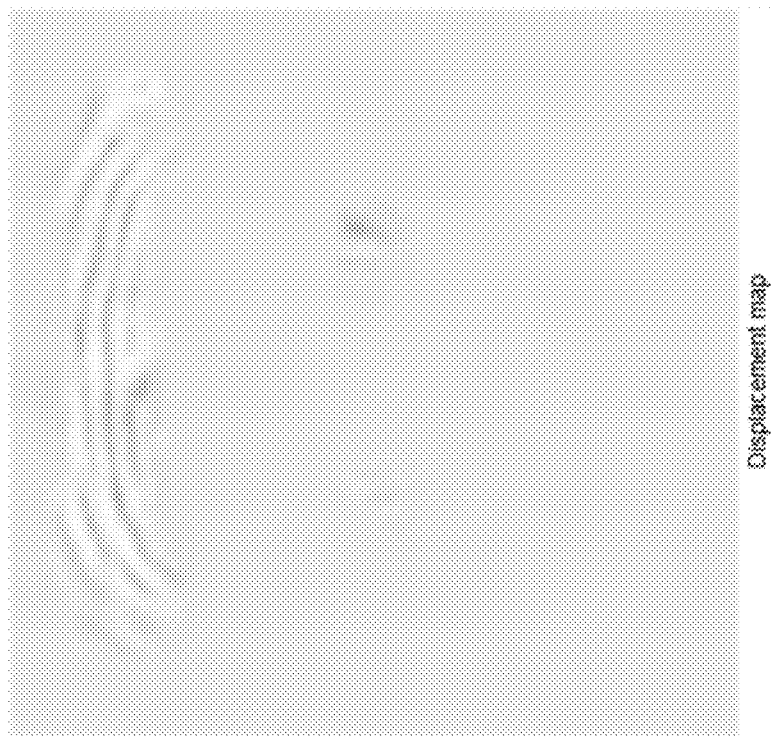
FIG. 10

3D GEOMETRY ENHANCEMENT METHOD AND APPARATUS THEREFOR

CROSS REFERENCE TO RELATED APPLICATION

The present application claims priority from Korean Patent Application Number 10-2017-0159416 filed on Nov. 27, 2017, the entire contents of which are incorporated herein for all purposes by this reference.

BACKGROUND

Field

The present invention relates to a sketch-based three-dimensional (3D) geometry enhancement method and an apparatus therefor.

Description

In the past, a function has been provided to each of the lines constituting a sketch. In addition, whenever one line is drawn, normal vectors within a certain range have been adjusted to be directed toward a corresponding texel with respect to a texel in which a line is drawn on a normal map. This is a function similar to a brush function provided by several graphics tools. Since three-dimensional (3D) information finally generated through a corresponding method is based on a displacement map reconstructed from a normal map changed by lines constituting a drawn sketch, 3D geometry cannot be changed in real time.

RELATED ART DOCUMENT

Patent Document 1: Korean Patent Application Publication No. 10-2017-0008683 (Published on Jan. 24, 2017)

BRIEF SUMMARY

According to an aspect of the present invention, provided is a 3D geometry enhancement method capable of interactively enhancing a 3D geometry surface shape by analyzing a sketch input by a user, and an apparatus therefor.

According to an embodiment of the present invention, a 3D geometry enhancement method includes: building a random forest regressor using sketch patches and displacement patches, wherein the displacement patches are patches corresponding to the sketch patches, placed on a displacement map of a 3D geometry model; receiving a new sketch; extracting displacement patches respectively corresponding to sketch patches extracted from the new sketch by applying the sketch patches to the built random forest regressor; generating a displacement map with respect to the 3D geometry model using the extracted displacement patches; and applying the generated displacement map to the 3D geometry model.

The building of the random forest regressor may include: receiving a sketch drawn on the 3D geometry model; generating the displacement map with respect to the 3D geometry model; generating an image pyramid by multi-scaling each of the sketch and the displacement map; randomly extracting the sketch patches from sketch images of respective scaling steps on the image pyramid; extracting the displacement patches with respect to the displacement map, respectively corresponding to the extracted sketch patches on the image pyramid; projecting the sketch patches and the displacement patches into a principal component analysis subspace by deriving feature values from the sketch patches and the displacement patches through a principal component analysis (PCA); and forming a connection relationship between the sketch patches and the displacement patches by building the random forest regressor using the feature values derived from the sketch patches and the displacement patches.

The image pyramid may be built by gradually reducing a size of each of an original sketch and an original displacement map through scaling.

The sketch patches and the displacement patches may be projected into the PCA subspace by deriving the feature values through the principal component analysis while dimensions are reduced.

The extraction of the displacement patches may include: generating an image pyramid by multiscaling the new sketch; randomly extracting sketch patches from sketch images of respective scaling steps on the image pyramid; deriving feature values from the sketch patches through a principal component analysis, and then, projecting the sketch patches into a PCA subspace to digitize the sketch patches; acquiring digitized displacement patches respectively corresponding to the digitized sketch patches by inputting the digitized sketch patches in the built random forest regressor; and acquiring displacement patches having an image type with respect to the digitized displacement patches by inversely performing a principal component analysis sub space projection process.

The displacement map may be generated by placing the displacement patches in the same position as the sketch patches and combining the displacement patches, wherein the displacement map is generated by applying poison image blending during the combining.

The displacement map may indicate a difference between an original 3D geometry model and a 3D geometry model to which a sketch is applied.

The application of the generated displacement map to the 3D geometry model may be processed with respect to UV coordinates of the displacement map, wherein a surface detail of the 3D geometry model is enhanced by moving a vertex of the 3D geometry model using displacement information stored in a position the UV coordinates.

In the application of the generated displacement map to the 3D geometry model, after a normal vector is calculated using the displacement map, a tessellation may be further performed on the 3D geometry model.

According to another aspect of the present invention, provided is an apparatus capable of interactively enhancing a 3D geometry surface shape by analyzing a sketch input by a user.

According to an embodiment of the present invention, provided is a computing device including: a memory storing one or more command; and a processor interworking with the memory and executing the one or more command stored in the memory, wherein the one or more command executed by the processor performs: building a random forest regressor using sketch patches and displacement patches, wherein the displacement patches are patches corresponding to the sketch patches and placing on a displacement map of a 3D geometry model; receiving a new sketch; extracting displacement patches respectively corresponding to sketch patches by applying the sketch patches extracted from the new sketch to the built random forest regressor; generating a displacement map with respect to a 3D geometry model using the extracted displacement patches; and applying the generated displacement map to the 3D geometry mode.

According to a 3D geometry enhancement method and an apparatus therefor according to an embodiment of the present invention, a 3D geometry surface shape may be interactively enhanced by analyzing a sketch input by a user.

In addition, according to the present invention, even non-professional user can easily generate and correct 3D geometry.

BRIEF DESCRIPTION OF THE DRAWINGS

The above and other objects, features and advantages of the present disclosure will be more clearly understood from the following detailed description when taken in conjunction with the accompanying drawings, in which:

FIG. 10 is a diagram illustrating a generated displacement map according to an embodiment of the present invention;

DETAILED DESCRIPTION

A singular representation may include a plural representation as far as it represents a definitely different meaning from the context. Terms "include" or "has" used herein should be understood that they are intended to indicate an existence of several components or several steps, disclosed in the specification, and it may also be understood that part of the components or steps may not be included or additional components or steps may further be included. In the following description, terms such as "unit" and "module" indicate a unit for processing at least one function or operation, wherein the unit and the block may be embodied as hardware or software or embodied by combining hardware and software.

Hereinafter, embodiments of the present invention will be described in detail with reference to the accompanying drawings.

Figure 1:
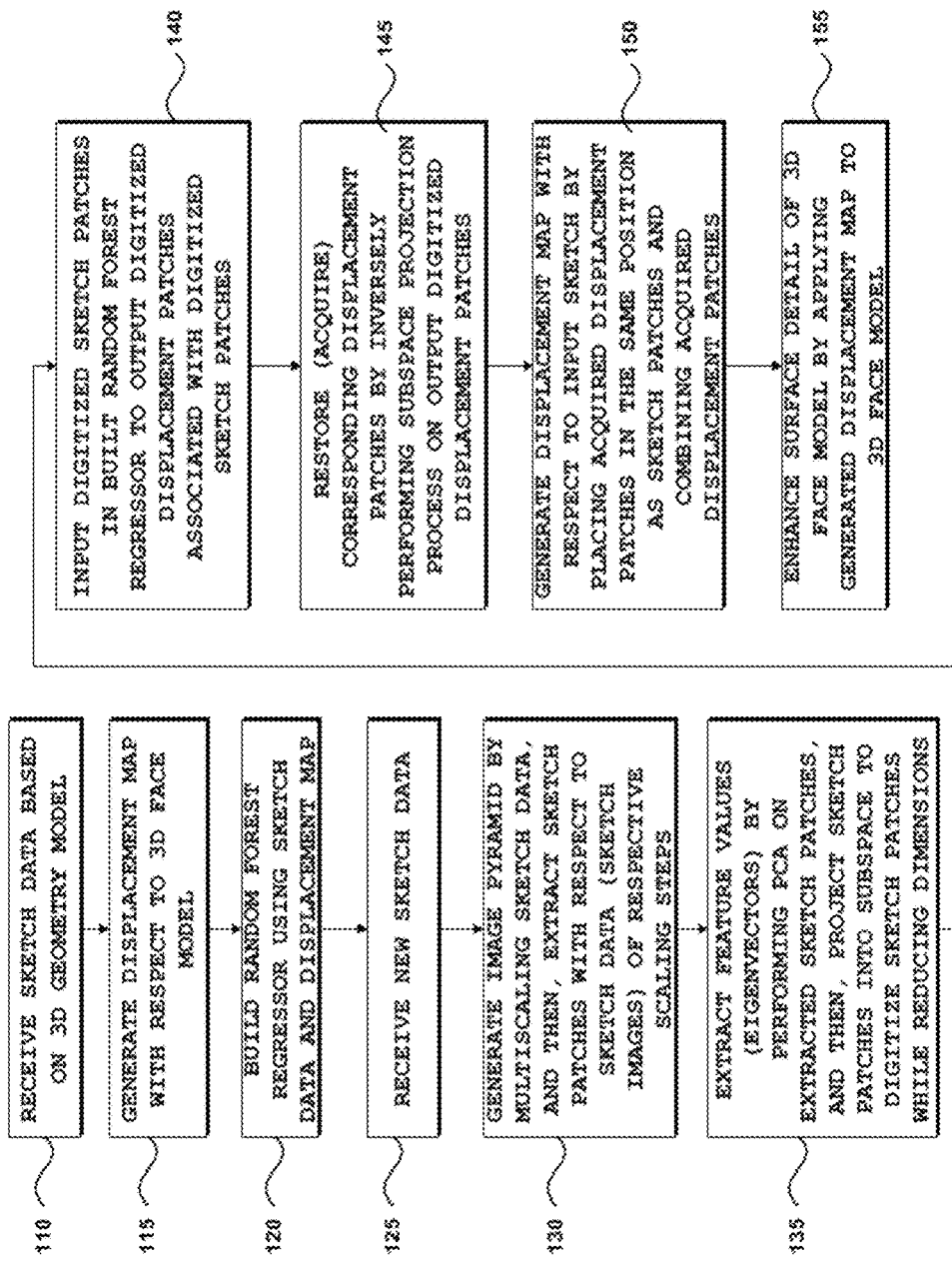
FIG. 1 is a flowchart of a three-dimensional (3D) geometry enhancement method according to an embodiment of the present invention.
Figure 2:
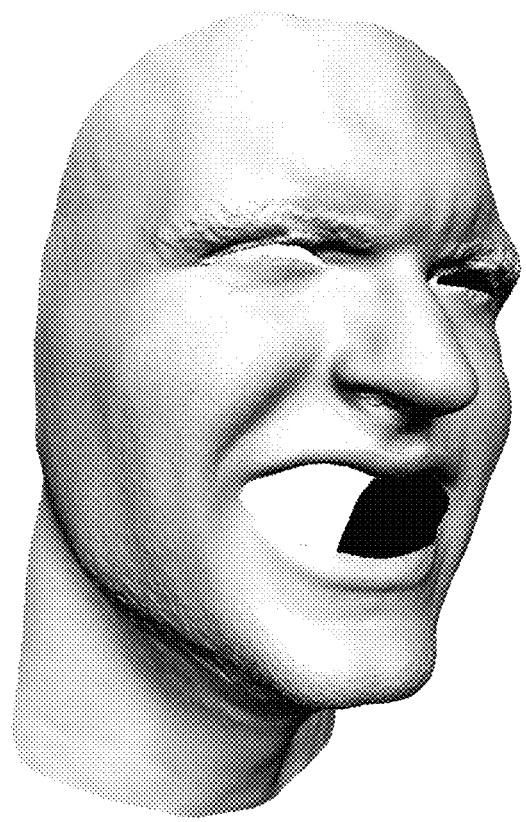
FIG. 2 is a diagram illustrating a 3D face model having no detailed wrinkle expression (sketch), according to an embodiment of the present invention.
Figure 3:
FIG. 3 is a diagram illustrating a 3D face model having a detailed wrinkle expression (sketch), according to an embodiment of the present invention.
Figure 4:
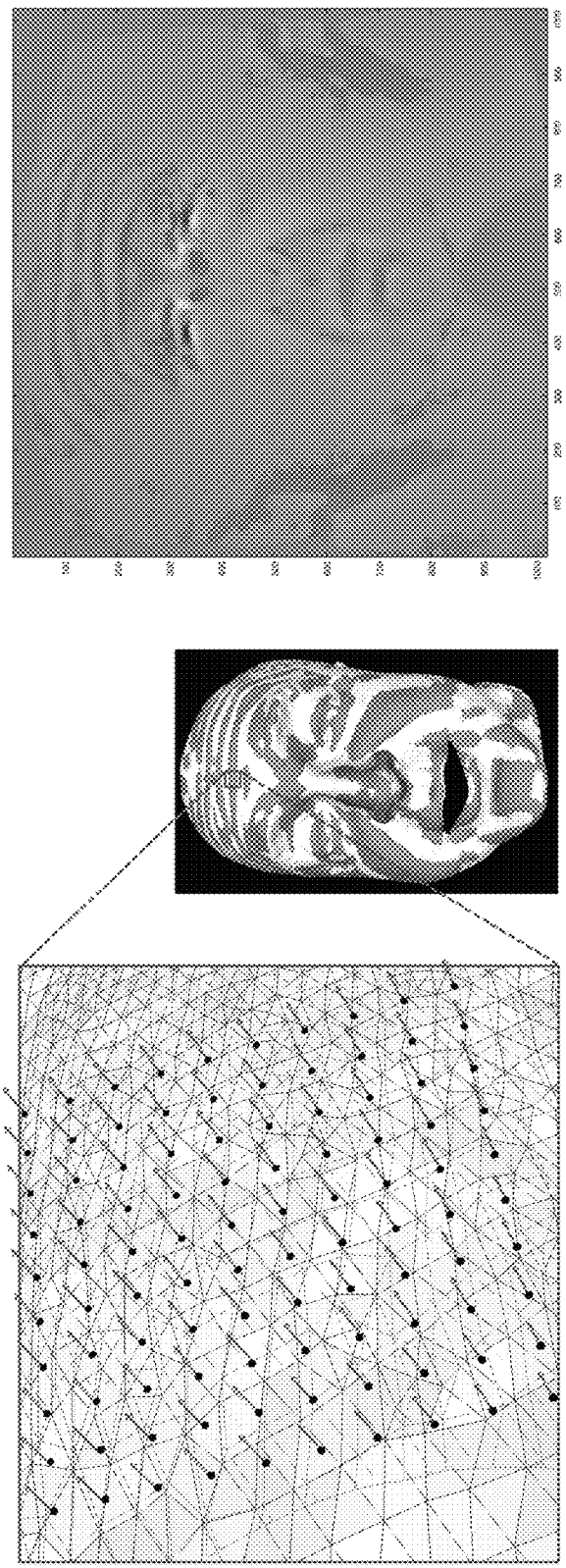
FIG. 4 is a diagram illustrating a displacement map generated based on the 3D face model of FIGS. 2 and 3.
Figure 5:
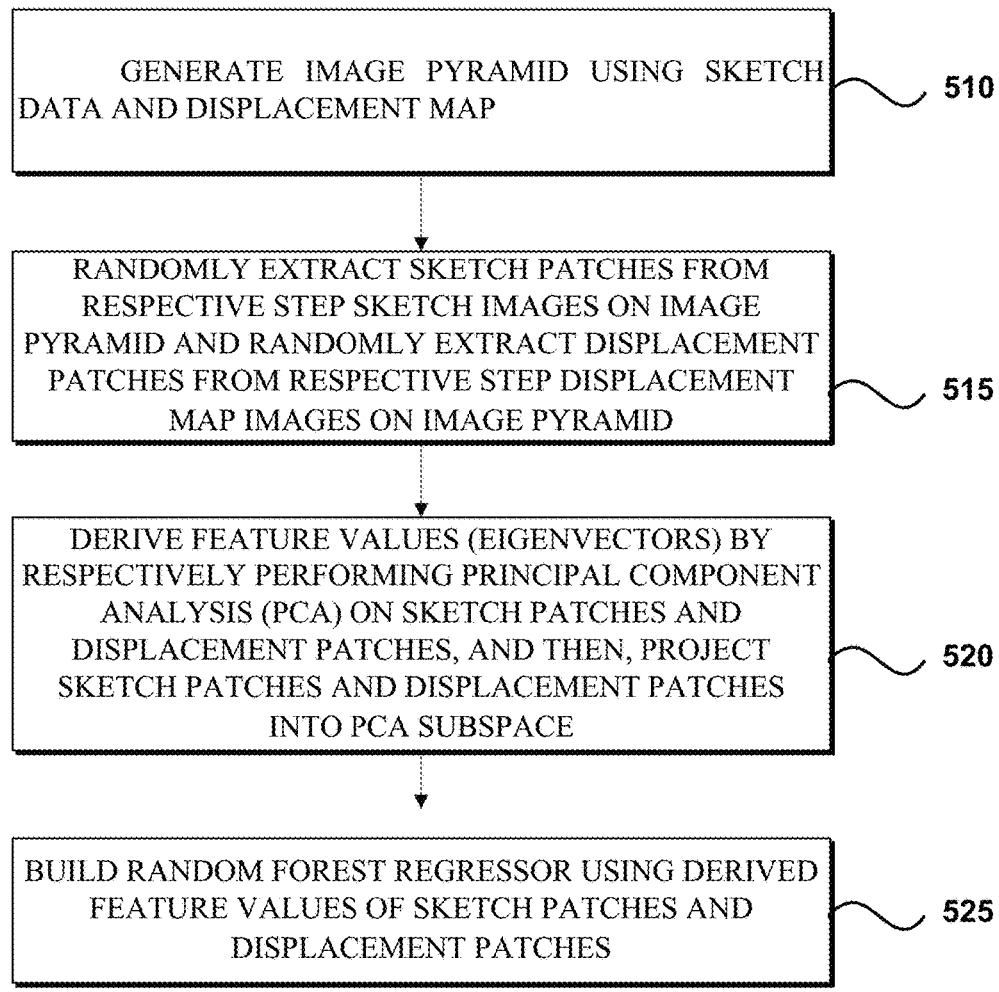
FIG. 5 is a flowchart of a method of building a random forest regressor based on sketch data and a displacement map, according to an embodiment of the present invention.
Figure 6:
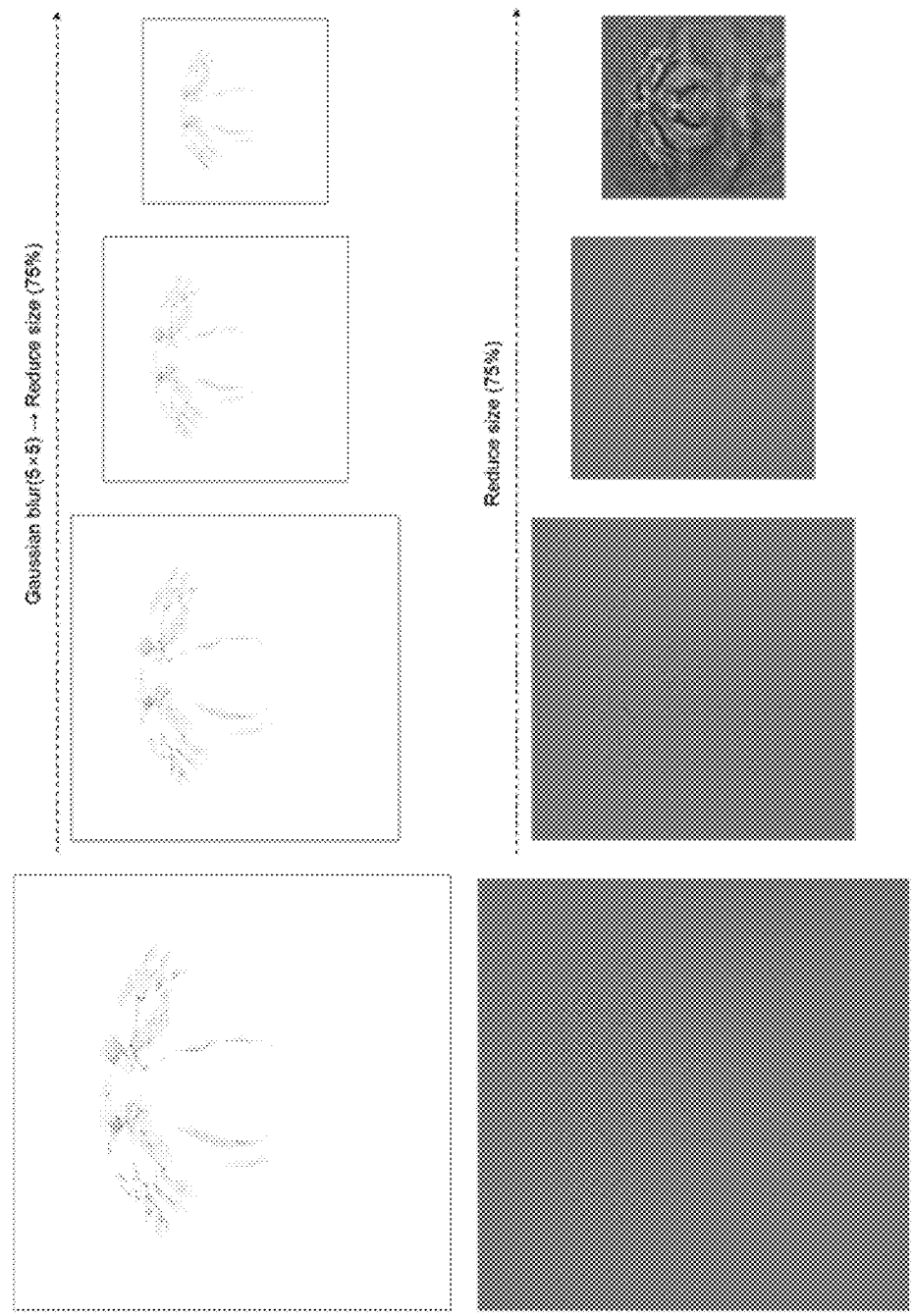
FIG. 6 is a diagram illustrating an image pyramid according to an embodiment of the present invention.
Figure 7:
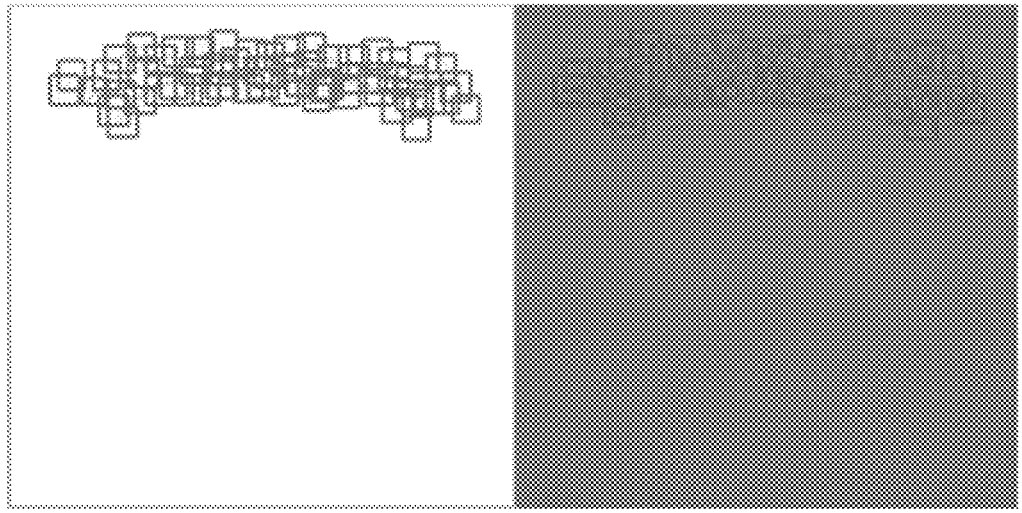
FIG. 7 is a diagram illustrating sketch patches and displacement patches based on an image pyramid, according to an embodiment of the present invention.
Figure 8:
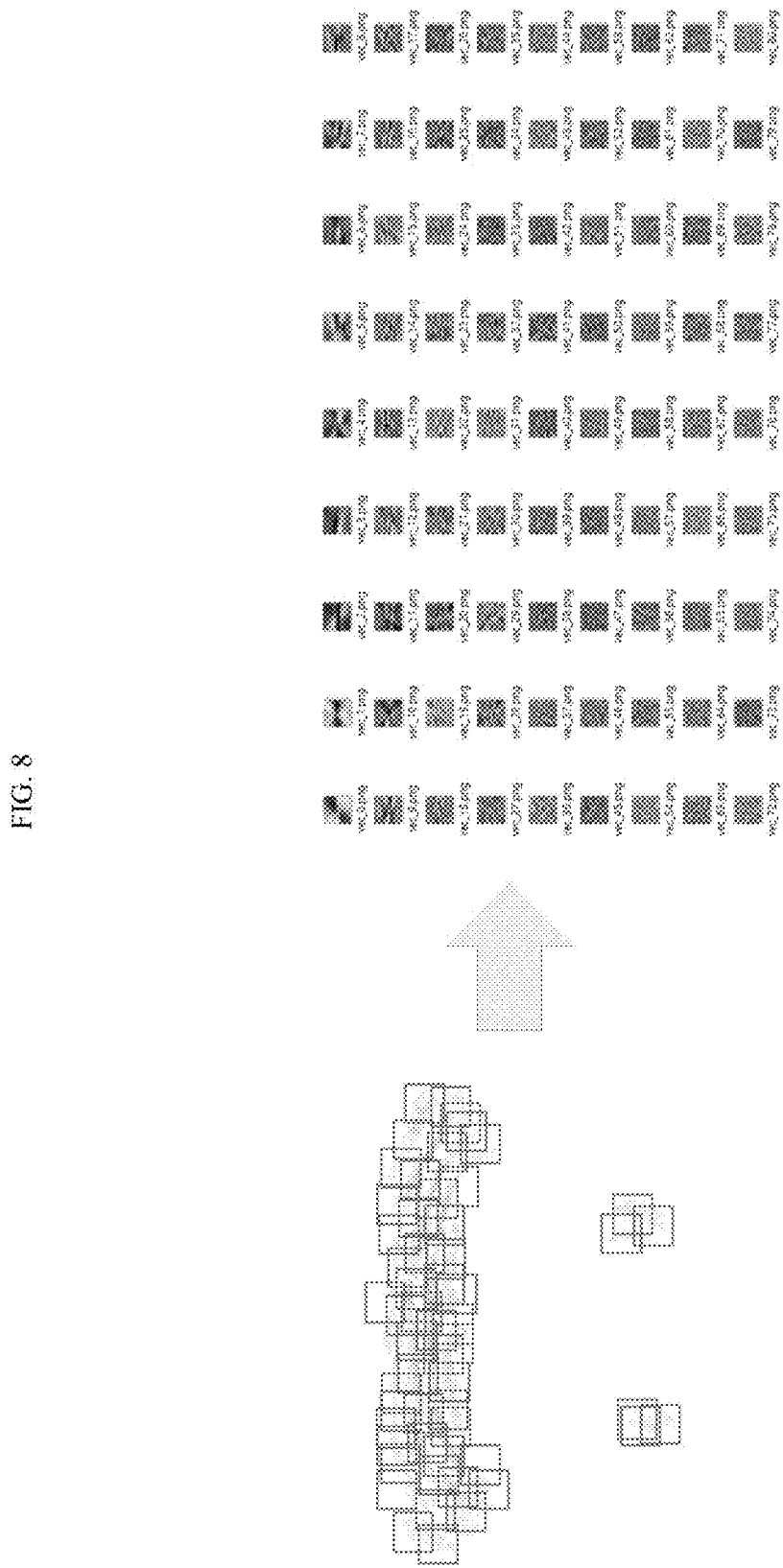
FIG. 8 is a diagram illustrating an example in which feature values (eigenvalues) of respective patches are projected into a subspace, according to an embodiment of the present invention.
Figure 9:
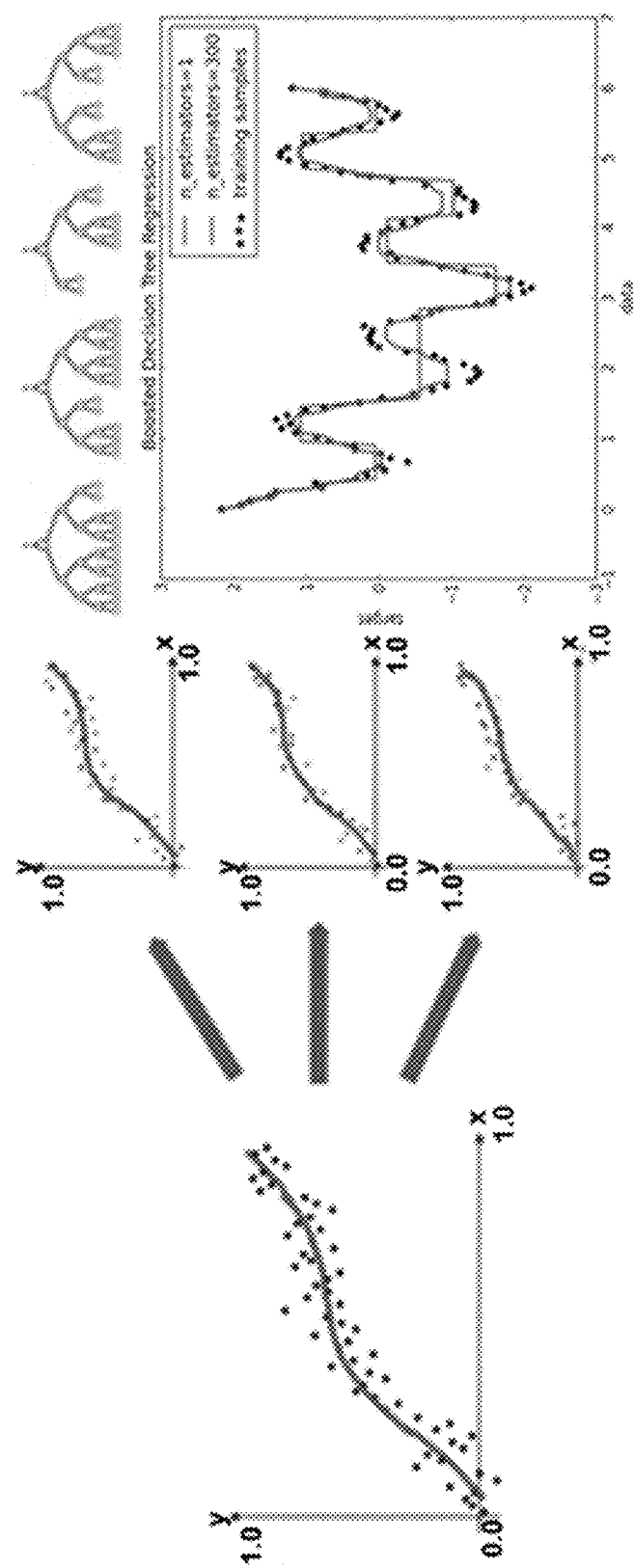
FIG. 9 is a diagram illustrating an example in which a random forest regressor is built according to an embodiment of the present invention.
Figure 11:
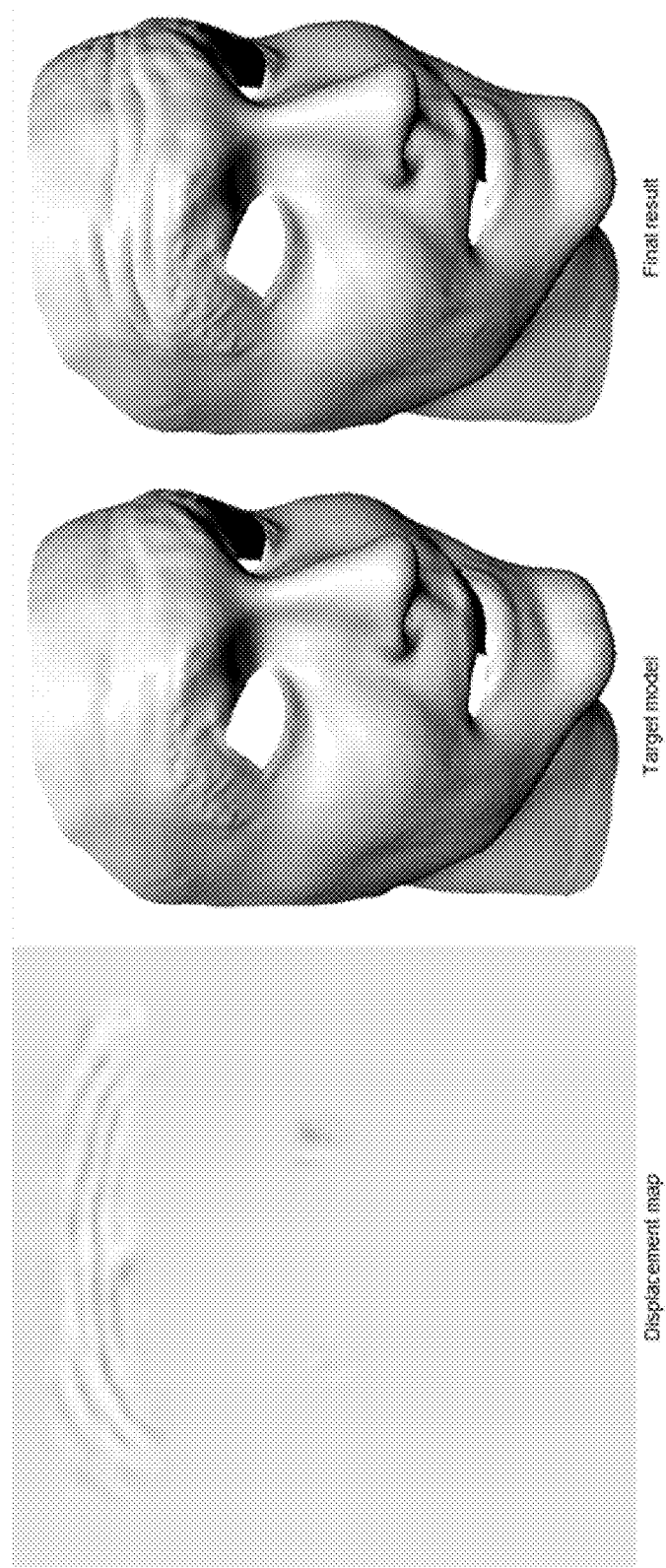
FIG. 11 is a diagram illustrating an enhancement result of a geometry model according to an embodiment of the present invention.

FIG. 1 is a flowchart of a three-dimensional (3D) geometry enhancement method according to an embodiment of the present invention. FIG. 2 is a diagram illustrating a 3D face model having no detailed wrinkle expression (sketch), according to an embodiment of the present invention. FIG. 3 is a diagram illustrating a 3D face model having a detailed wrinkle expression (sketch), according to an embodiment of the present invention. FIG. 4 is a diagram illustrating a displacement map generated based on the 3D face model of FIGS. 2 and 3. FIG. 5 is a flowchart of a method of building a random forest regressor based on sketch data and a displacement map, according to an embodiment of the present invention. FIG. 6 is a diagram illustrating an image pyramid according to an embodiment of the present invention. FIG. 7 is a diagram illustrating sketch patches and displacement patches based on an image pyramid, according to an embodiment of the present invention. FIG. 8 is a diagram illustrating an example in which feature values (eigenvalues) of respective patches are projected into a subspace, according to an embodiment of the present invention. FIG. 9 is a diagram illustrating an example in which a random forest regressor is built according to an embodiment of the present invention. FIG. 10 is a diagram illustrating a generated displacement map according to an embodiment of the present invention. FIG. 11 is a diagram illustrating an enhancement result of a geometry model according to an embodiment of the present invention.

In step 110, a computing device 100 receives sketch data based on a 3D geometry model. Here, the sketch data may be a sketch drawn on a 3D geometry model.

In an embodiment of the present invention, descriptions of the 3D geometry model are provided as a 3D face model, but the present invention is not limited thereto.

A user may receive a sketch to depict a detailed expression (for example, wrinkles) on a 3D face model through the computing device 100 in a state in which the 3D face model (geometry model) is displayed.

Here, wrinkles depicted on the 3D face model (geometry model) by the user may be depicted differently according to the 3D face model. When a detailed expression (for example, wrinkles) is depicted on the same 3D face model (geometry model), features may be depicted differently for each individual.

That is, different pieces of sketch data may be input in the same 3D face model, and the same sketch data or different pieces of sketch data may be input in different 3D face models.

However, in order to build a random forest regressor, since pieces of sketch data are input so as to be in one-to-one correspondence with 3D face models, in the present specification, a case in which one piece of sketch data is input to one 3D face model will be described.

In step 115, the computing device 100 generates a displacement map with respect to the 3D face model.

For example, the computing device 100 may generate a displacement map between an original 3D face model and a 3D face model reflecting a sketch.

This is illustrated in detail in FIG. 2.

FIG. 2 illustrates a 3D face model having no detailed wrinkle expression (sketch), and FIG. 3 illustrates a 3D face model having a detailed wrinkle expression (sketch).

That is, a user may sketch detailed forehead wrinkles on a 3D face model having no wrinkle expression in a state in which the 3D face model (referred to as a 3D geometry model for convenience of description) is displayed, as illustrated in FIG. 2.

Therefore, the computing device 100 may generate a displacement map by calculating a difference between the original 3D geometry model and the 3D geometry model having the forehead wrinkles.

FIG. 4 illustrates a displacement map generated based on the 3D face model of FIGS. 2 and 3. As illustrated in FIG. 4, the displacement map may include information on a portion, such as a detailed wrinkle, different from that of the original 3D face model.

In step 120, the computing device 100 builds a random forest regressor using sketch data and a displacement map.

A method of building a random forest regressor based on sketch data and a displacement map will be described in detail with reference to FIG. 5.

In an embodiment of the present invention, the random forest regressor is built so as to form a connection relationship between the sketch data and the displacement map. However, since the random forest regressor itself is unrelated to deriving feature values with respect to respective images, after digitized feature values with respect to respective images are derived in the random forest regressor, a connection relationship between two images may be learned, based on the derived feature values.

To this end, in step 510, the computing device 100 generates an image pyramid using the sketch data and the displacement map.

For example, the computing device 100 may generate an image pyramid by multiscaling the sketch data and may also generate an image pyramid by multiscaling the displacement map in the same manner as in the sketch data.

A method of generating an image pyramid will be briefly described with reference to FIG. 6.

A method of generating an image pyramid with respect to the sketch data is the same as the method of generating an image pyramid with respect to the displacement map. Therefore, a case in which an image pyramid with respect to the sketch data is generated through multiscaling will be described.

For example, it is assumed that a size of sketch data (image) drawn on a 3D face model is 1,024×1,024. The computing device 100 may reduce a size of the sketch image by a certain ratio through scaling.

For convenience, original sketch data will be referred to as first sketch data. The computing device 100 may reduce the first sketch data by a certain ratio (for example, 25%) through scaling to generate second sketch data. A size of the second sketch data may be 768×768. The computing device 100 may reduce the second sketch data by a certain ratio through scaling to generate third sketch data. A size of the third sketch data may be 576×576. In the same manner, the computing device 100 may reduce the third sketch data by a certain ratio (for example, 25%) through scaling to generate fourth sketch data. A size of the fourth sketch data may be 432×432.

FIG. 6 illustrates that an image pyramid is generated through four scaling steps, but a multiscaling step may not be separately limited.

In addition, in the present invention, it has been described that a specific image is reduced by a specific rate, i.e. 25% through scaling for convenience of understanding and description. It is natural that a scaling ratio is randomly adjustable according to an implementation method.

In order to build a random forest regressor, the sketch data and the displacement map may be limited so as to be scaled through the same method.

In addition, when the image pyramid is generated, images scaled down in respective scaling steps are sequentially stacked in such a manner that an original image is placed at a bottom of the image pyramid and an image having the smallest size is placed at a top of the image pyramid.

Since the method of generating the image pyramid with respect to the displacement map is the same as the method of generating the image pyramid with respect to the sketch data, repeated descriptions thereof will be omitted.

In step 515, the computing device 100 randomly extracts sketch patches from sketch images of respective scaling steps on the image pyramid. The computing device 100 may randomly extract displacement patches from displacement map images of respective scaling steps on the image pyramid. At least one of a size and a position of the sketch patch extracted from the sketch image may be the same as that of the displacement patch of the displacement map image.

In step 520, the computing device 100 derives feature values (eigenvectors) by respectively performing a principal component analysis (PCA) on the sketch patches and the displacement patches, and then projects the sketch patches and the displacement patches into a PCA subspace (hereinafter, referred to as a subspace).

The computing device 100 extracts patches having a certain size in a random position of the images in respective scaling steps on the image pyramid, respectively. The computing device 100 may calculate feature values (eigenvectors) by respectively performing the PCA on the extracted patches, and may project the extracted patches into the subspace. FIG. 7 illustrates an example in which patches are extracted. At this time, while reducing dimensions, the computing device 100 may project patches into the subspace and convert the projected patches into digitized forms easy to learn. FIG. 8 illustrates an example in which feature values (eigenvalues) of respective patches are projected into the subspace.

Unlike general deep learning, learning through the random forest regressor differs from a method of deriving a correct answer to a question in which the correct answer is not given, through deduction. The random forest regressor is a learning method providing a result for input in a building (learning) step.

According to an embodiment of the present invention, the connection relationship between the sketch patches and the displacement patches is formed through the random forest regressor. Therefore, a preprocessing process with respect to the sketch patches and the displacement patches required to build the random forest regressor may be performed through steps 515 to 520.

In an embodiment of the present invention, in order to build a strong regressor using only features by excluding pieces of detailed information corresponding to noises from an original face model, respective patches may be digitized by deriving feature values (eigenvectors) with respect to the sketch patches and the displacement patches through the PCA.

A regressor may be learned by inputting the digitized sketch patches and displacement patches in the random forest regressor, and the connection relationship between the sketch patches and the displacement patches may be formed (learned).

In step 525, the computing device 100 builds the random forest regressor using the derived feature values of the sketch patches and the displacement patches. FIG. 9 illustrates an example in which a random forest regressor is built.

That is, the connection relationship between the sketch patches and the displacement patches may be formed by mapping and inputting the digitized sketch patches and the displacement patches corresponding to geometry patches, in the random forest regressor, the geometry patches corresponding to the digitized sketch patches.

The method of learning the random forest regressor based on the sketch data the displacement map of the 3D face model has been described. Hereinafter, an enhancement method including generating a displacement map corresponding to a sketch input through the random forest regressor learned (built) as described above, and applying the generated displacement map to a 3D geometry model will be described.

Referring to FIG. 1 again, in step 125, the computing device 100 receives new sketch data.

In step 130, the computing device 100 generates an image pyramid by multiscaling the received sketch data, and then, extracts sketch patches with respect to sketch data (sketch image) of each scaling step.

In step 135, the computing device 100 extracts feature values (eigenvectors) by performing a PCA on the extracted sketch patches, and then, projects the sketch patches into a subspace to digitize the sketch patches while reducing dimensions.

In step 140, the computing device 100 inputs the digitized sketch patches in the built random forest regressor to output digitized displacement patches associated with the digitized sketch patches.

In step 145, the computing device 100 restores (acquires) corresponding displacement patches by inversely performing a subspace projection process on the output digitized displacement patches.

For example, the computing device 100 may acquire displacement patches having an image type by calculating the subspace projection process in reverse order using the feature values (eigenvectors) of the displacement patches illustrated in FIG. 5 and an average of the feature values.

In step 150, the computing device 100 generates a displacement map with respect to an input sketch by placing the acquired displacement patches in the same position as the sketch patches and combining the acquired displacement patches.

FIG. 10 illustrates the displacement map generated in response to the input sketch.

When the displacement patches are combined, a boundary may be generated in a location at which the displacement patches are connected. Therefore, the computing device 100 may smoothly combine the displacement patches without the boundary at the connection place of the displacement patches by applying poison image blending.

When the displacement map is generated, as described above, in step 155, the computing device 100 enhances a surface detail of the 3D face model by applying the generated displacement map to the 3D face model.

The detail enhancement with respect to an expression of the 3D face model (geometry model) is performed with respect to texture UV coordinates of the 3D face model. In the past, detail enhancement has been performed with respect to vertex coordinates of geometry. However, in an embodiment of the present invention, since texture UV coordinates and displacement information on a corresponding position are used, it is possible to overcome a constraint of texture resolution, according to resolution of geometry.

In an embodiment of the present invention, the generated displacement map is a kind of texture. When the generated map is input in a processor (GPU), in the processor, a vertex of a corresponding position may be moved using displacement information stored in input UV coordinates.

Generally, when a placement map is applied to a geometry model, a normal map, generated together with a displacement map for calculating a shadow, should be input. However, in an embodiment of the present invention, since a displacement map generated from a sketch is used in the detail enhancement of the 3D face model geometry, there is no normal map. Therefore, a step of applying the generated displacement map to the 3D face model (geometry), a processor processes an operation of calculating a normal vector from the displacement map.

In addition, in an embodiment of the present invention, a processor-based tessellation may also be performed in order for a detail enhancement of a low resolution geometry model.

When a tessellation is performed, the computing device 100 according to an embodiment of the present invention may perform interpolation to smoothly connect surfaces even at a boundary of a geometry mesh by using a Bezier curve.

FIG. 11 illustrates a final enhancement result of a displacement map generated on an original 3D face model, according to an embodiment of the present invention.

As illustrated in FIG. 11, according to an embodiment of the present invention, a detailed expression of a surface of a 3D geometry model may be enhanced by learning a connection relationship between sketch patches and displacement patches through a random forest regressor, extracting displacement patches corresponding to new sketch patches, generating a displacement map based on the extracted displacement patches, and applying the generated displacement map to the 3D geometry model.

Figure 12:
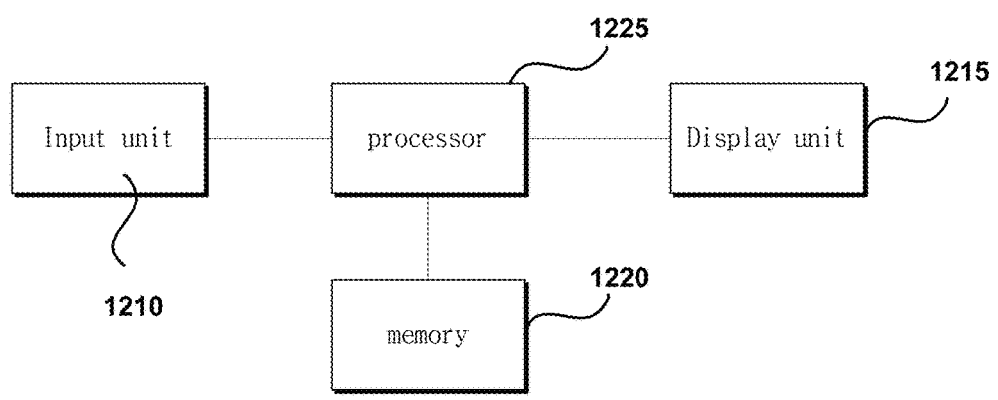
FIG. 12 is a block diagram illustrating an internal configuration of a computing device according to an embodiment of the present invention.

FIG. 12 is a schematic block diagram illustrating an internal configuration of the computing device 100 according to the embodiment of the present invention.

Referring to FIG. 12, the computing device 100 according to the embodiment of the present invention includes an input 1210, a display 1215, a memory 1220, and a processor 1225.

The input 1210 is a means for receiving various commands required to control or operate the computing device 100.

For example, the input 1210 may be a touch pad. In addition, any means may also be applied to the input 1210 without restrictions as long as a means has a form for receiving various sketches or commands from a user.

The display 1215 is a means for outputting data input or stored through the computing device 100 in a form of visual information.

For example, the display 1215 may be a liquid crystal screen.

The memory 1220 may sore one or more command.

The processor 1225 is a means for controlling inner components (for example, the input 1210, the display 1215, and the memory 1220) of the computing device 100 according to the embodiment of the present invention.

In addition, the processor 1225 may interwork with the memory 1220 to execute commands stored in the memory 1220. The commands executed by the processor 1225 may perform steps illustrated in FIG. 1. Since descriptions thereof are the same as the descriptions provided with reference to FIGS. 1 to 11, repeated descriptions will be omitted.

Methods according to embodiments of the present disclosure may be implemented in the form of program instructions executable through diverse computing means and may be recorded in computer readable media. The computer readable media may include independently or associatively program instructions, data files, data structures, and so on. Program instructions recorded in the media may be specially designed and configured for the present invention, or may be generally known by those skilled in the computer software art. Computer readable recording media may include magnetic media such as hard disks and floppy disks, optical media such as CD-ROM and DVD, magneto-optical media such as floptical disks, and hardware units, such as ROM, RAM, flash memory, and so on, which are intentionally formed to store and perform program instructions. Program instructions may include high-class language codes executable by computers using interpreters, as well as machine language codes likely made by compilers. The hardware units may be configured to function as one or more software modules for performing operations according to embodiments of the present disclosure, and vice versa.

While the present invention has been described above using particular examples, including specific components, by way of limited embodiments and drawings, it is to be appreciated that these are provided merely to aid the overall understanding of the present invention, the present invention is not to be limited to the embodiments above, and various modifications and alterations can be made from the disclosures above by a person having ordinary skill in the technical field to which the present invention pertains. Therefore, the spirit of the present invention must not be limited to the embodiments described herein, and the scope of the present invention must be regarded as encompassing not only the claims set forth below, but also their equivalents and variations.

What is claimed is:

1. A 3D geometry enhancement method, the method performed by a computer device including a processor, the method comprising:
   building, by the processor, a random forest regressor using sketch patches and displacement patches, wherein the displacement patches are patches corresponding to the sketch patches, placed on a displacement map of a 3D geometry model;
   receiving, by the processor, a new sketch;
   extracting, by the processor, displacement patches respectively corresponding to sketch patches extracted from the new sketch by applying the sketch patches to the built random forest regressor;
   generating, by the processor, a displacement map with respect to the 3D geometry model using the extracted displacement patches; and
   applying, by the processor, the generated displacement map to the 3D geometry model,
   wherein the applying the generated displacement map to the 3D geometry model comprises:
      calculating, by the processor, a normal vector from the generated displacement map to the 3D geometry model; and
      performing, by the processor, a tessellation on the 3D geometry model for a detail enhancement of a low resolution 3D geometry model.

2. The 3D geometry enhancement method of claim 1, wherein the building of the random forest regressor comprises:
   receiving, by the processor, a sketch drawn on the 3D geometry model;
   generating, by the processor, the displacement map with respect to the 3D geometry model;
   generating, by the processor, an image pyramid by multiscaling each of the sketch and the displacement map;
   randomly extracting, by the processor, the sketch patches from sketch images of respective scaling steps on the image pyramid;
   extracting, by the processor, the displacement patches with respect to the displacement map, respectively corresponding to the extracted sketch patches on the image pyramid;
   projecting, by the processor, the sketch patches and the displacement patches into a principal component analysis subspace by deriving feature values from the sketch patches and the displacement patches through a principal component analysis (PCA); and
   forming, by the processor, a connection relationship between the sketch patches and the displacement patches by building the random forest regressor using the feature values derived from the sketch patches and the displacement patches.

3. The 3D geometry enhancement method of claim 2, wherein the image pyramid is built by gradually reducing a size of each of an original sketch and an original displacement map through scaling.

4. The 3D geometry enhancement method of claim 2, wherein the sketch patches and the displacement patches are projected into the PCA subspace by deriving the feature values through the principal component analysis while dimensions are reduced.

5. The 3D geometry enhancement method of claim 1, wherein the extraction of the displacement patches comprises:
   generating, by the processor, an image pyramid by multiscaling the new sketch;
   randomly extracting, by the processor, sketch patches from sketch images of respective scaling steps on the image pyramid;
   deriving, by the processor, feature values from the sketch patches through a principal component analysis, and then, projecting the sketch patches into a PCA subspace to digitize the sketch patches;
   acquiring, by the processor, digitized displacement patches respectively corresponding to the digitized sketch patches by inputting the digitized sketch patches in the built random forest regressor; and
   acquiring, by the processor, displacement patches having an image type with respect to the digitized displacement patches by inversely performing a principal component analysis subspace projection process.

6. The 3D geometry enhancement method of claim 1, wherein the displacement map is generated by placing the displacement patches in the same position as the sketch patches and combining the displacement patches, wherein the displacement map is generated by applying poison image blending during the combining.

7. The 3D geometry enhancement method of claim 1, wherein the displacement map indicates a difference between an original 3D geometry model and a 3D geometry model to which a sketch is applied.

8. The 3D geometry enhancement method of claim 1, wherein the application of the generated displacement map to the 3D geometry model is processed with respect to UV coordinates of the displacement map, wherein a surface detail of the 3D geometry model is enhanced by moving a vertex of the 3D geometry model using displacement information stored in a position the UV coordinates.

9. A non-transitory computer-readable storage medium having a program to perform a the 3D geometry enhancement method by a computer device including a processor, the method comprising:
   building, by the processor, a random forest regressor using sketch patches and displacement patches, wherein the displacement patches are patches corresponding to the sketch patches, placed on a displacement map of a 3D geometry model;

receiving, by the processor, a new sketch;

extracting, by the processor, displacement patches respectively corresponding to sketch patches extracted from the new sketch by applying the sketch patches to the built random forest regressor;

generating, by the processor, a displacement map with respect to the 3D geometry model using the extracted displacement patches; and applying, by the processor, the generated displacement map to the 3D geometry model, wherein the applying the generated displacement map to the 3D geometry model comprises:

calculating, by the processor, a normal vector from the generated displacement map to the 3D geometry model; and performing, by the processor, a tessellation on the 3D geometry model for a detail enhancement of a low resolution 3D geometry model.

10. A computing device comprising:

a memory storing one or more command; and a processor interworking with the memory and executing the one or more command stored in the memory, wherein the one or more command executed by the processor performs:

building a random forest regressor using sketch patches and displacement patches, wherein the displacement patches are patches corresponding to the sketch patches and placing on a displacement map of a 3D geometry model;

receiving a new sketch;

extracting displacement patches respectively corresponding to sketch patches by applying the sketch patches extracted from the new sketch to the built random forest regressor;

generating a displacement map with respect to a 3D geometry model using the extracted displacement patches; and applying the generated displacement map to the 3D geometry mode, wherein the applying the generated displacement map to the 3D geometry model comprises:

calculating a normal vector from the generated displacement map to the 3D geometry model; and performing a tessellation on the 3D geometry model for a detail enhancement of a low resolution 3D geometry model.

* * * * *